April 16, 1968   A. E. HODSON ET AL   3,377,872
MONITORED RATE GYROSCOPE SYSTEM
Filed March 31, 1965   5 Sheets-Sheet 1

INVENTORS
ANTHONY EDWARD HODSON
RICHARD PETER GLAVES COLLINSON
BY
ATTORNEYS

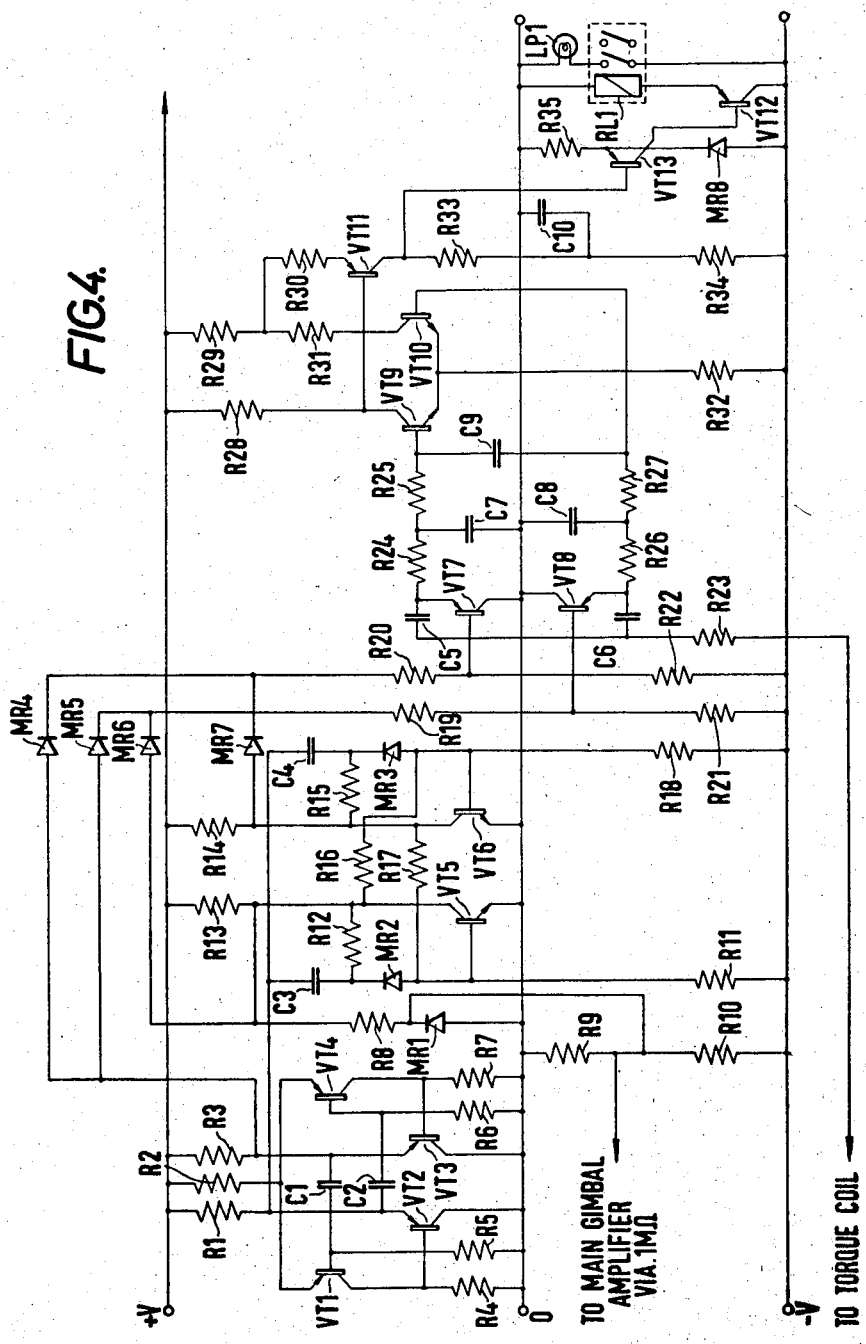

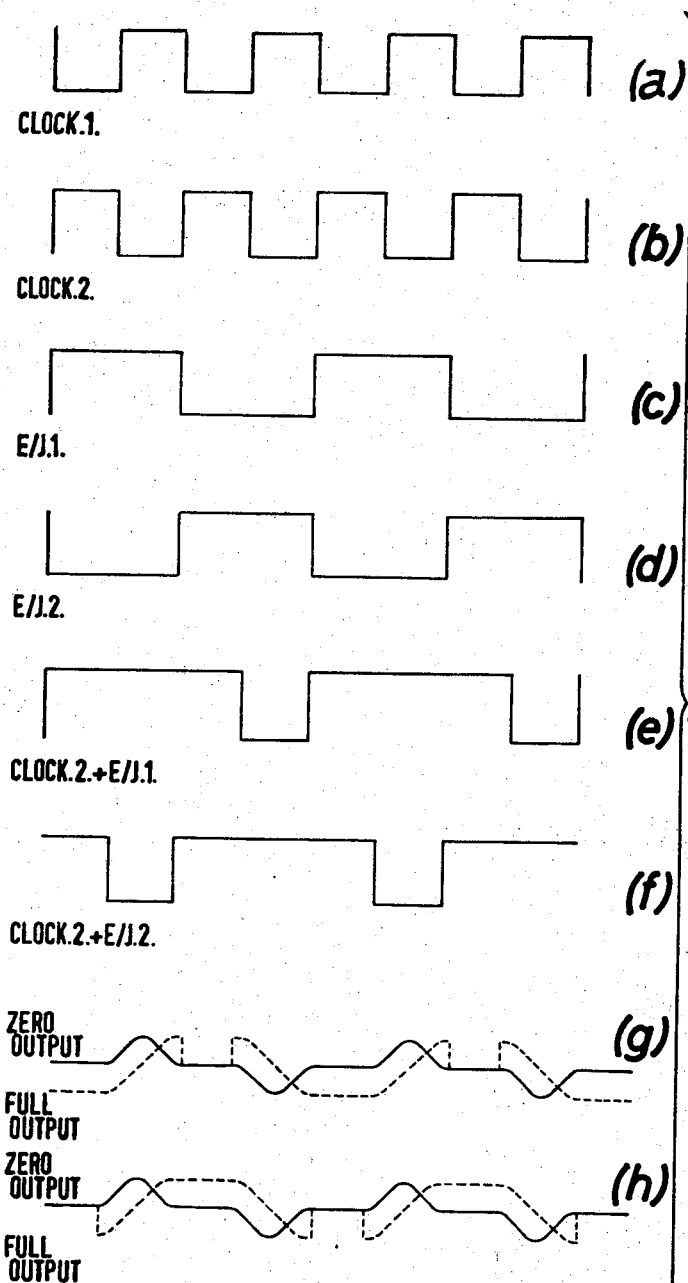

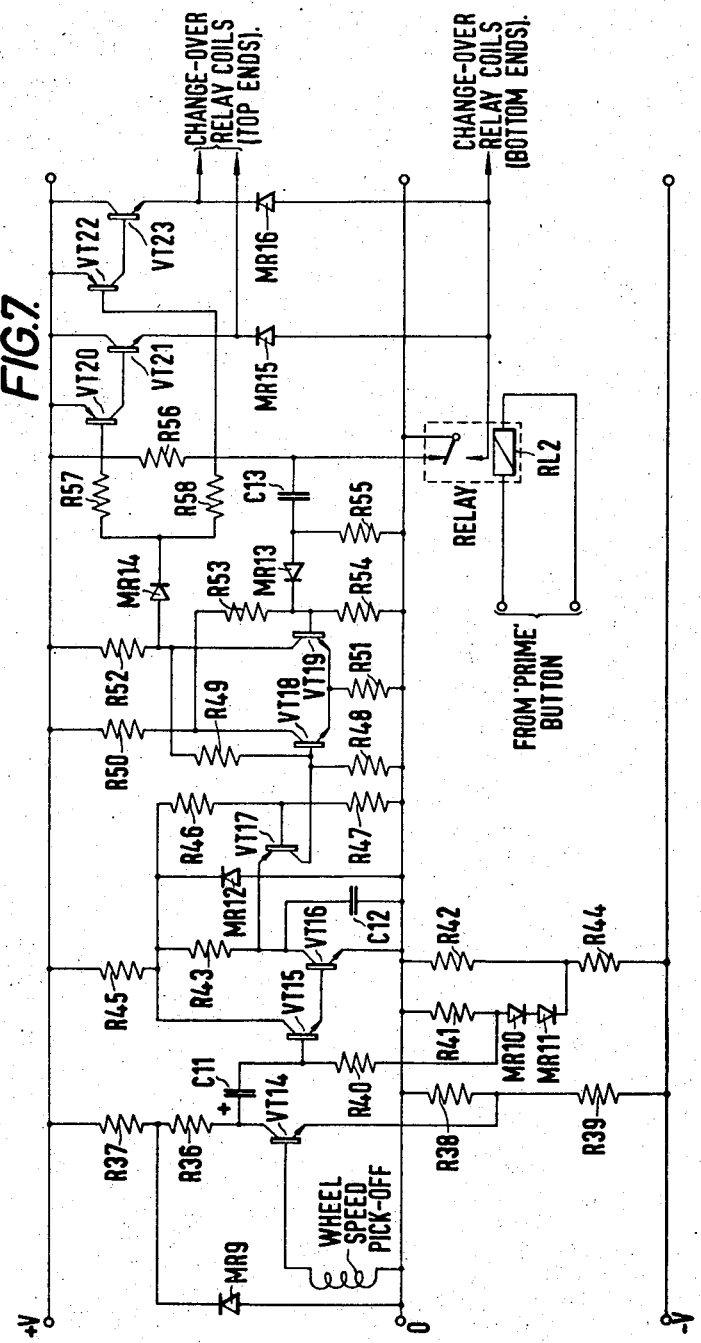

United States Patent Office 3,377,872
Patented Apr. 16, 1968

3,377,872
MONITORED RATE GYROSCOPE SYSTEM
Anthony E. Hodson and Richard P. G. Collinson, Lewisham, London, England, assignors to Elliott Brothers (London) Limited, London, England, a British company
Filed Mar. 31, 1965, Ser. No. 444,324
Claims priority, application Great Britain, Mar. 31, 1964, 13,219/64
20 Claims. (Cl. 74—5.6)

ABSTRACT OF THE DISCLOSURE

A rate gyroscope system monitored for precession and speed and direction of rotation. A closed servo control loop monitors the gimbal damping for undue friction, and magnets set in the surface of the rotor co-operate with a magnetic pick-off so as to indicate the direction of rotor rotation.

---

This invention relates to control systems incorporating a rate gyroscope, and more especially to a system incorporating a rate gyroscope and including also means to detect and indicate the presence of failures or faults which may develop within itself.

Many types of control systems used for various purposes, such as aircraft controls, including automatic pilots, automatic steering gears and stabilizers for ships, and control systems for other purposes, contain rate gyroscopes which provide a movement corresponding to the rate at which the gyroscope mounting is deflected from an initial datum or null position. The correct operation of the control naturally depends upon the absence of any fault in the system which includes the rate gyroscope.

Accordingly, an important object of the invention is to provide a rate gyroscope system which includes means for detecting any one of a variety of faults which may arise in the system, and which produces a signal or other indication that a fault is present, so that remedial action may be taken immediately.

Another object is to provide a gyroscope system which will respond to faulty rotational conditions to produce a signal signifying a fault and which will also respond to the presence of excessive damping or resistance to movement of the gimbal structure of the system to signify a fault therein.

A further object is to provide, in a gyroscope system, means to monitor the speed of the rotor and the amount of its deflection from a neutral or null position, and a detector which provides a signal whose frequency indicates a fault in rotational conditions and whose amplitude indicates a departure from the neutral position.

Still another object is to provide a gyroscope system in which the gimbal structure is monitored by a servo loop control system including means to apply an electrical input signal tending to move the gimbal arrangement, thereby causing the servo system to produce a counteracting signal if the gimbal structure is operating correctly, excessive damping in the form of resistance to movement of the gimbal structure causing a fault signal to be produced.

The invention consists of a gyroscope system including a rate gyroscope comprising electrical means associated with the gyroscope rotor to monitor the rotation thereof, and means responsive to any departure from predetermined operational conditions to provide a signal signifying a fault.

The means responsive to the said departure may include an arrangement capable of producing a fault signal in the event of the gimbal structure of the gyroscope system being subjected to damping conditions which produce a resistance to movement in excess of a predetermined maximum.

The gimbal structure may be monitored by a servo loop control system which includes input means capable of applying an electrical input signal which tends to move the gimbal structure, the electrical input signal being countered by the servo loop control system during correct operation of the gyroscope system and being utilized to produce an output fault signal from the servo loop control system if the movement of the gimbal structure is subjected to excessive damping.

The means to monitor the rotation of the gyroscope rotor may include means by which the direction of rotation of the gyroscope rotor may be determined. The means to determine the direction of rotation may include magnetic elements fitted into the cylindrical surface of the rotor so as to rotate therewith and a stationary pick-off, the arrangement of the magnetic elements being such that the direction of rotation of the gyroscope rotor may be determined. These elements may comprise two permanent magnets arranged side by side, the north pole of one magnet being adjacent the south pole of the other, the co-operating portions of the magnets and the pick-off being set at an angle to one another.

In a preferred embodiment of the invention, means are provided to monitor the speed of the rotor and the amount of its deflection from a neutral or null position and the means to indicate a failure comprise a detector responsive to a signal from the monitoring means which corresponds in frequency with the rate of rotation and in amplitude to the proximity of the gyroscope to the null position. Conveniently these means are electrical in nature.

In order to promote a clear understanding of the invention and its features and advantages, preferred embodiments thereof will now be described by way of example, with reference to the drawings accompanying the provisional specification of our application No. 13,219/64 referred to herein as FIGURES 1 and 2, and the drawings accompanying the provisional specification of our application No. 42,049/64, referred to herein as FIGURES 3 to 7. In the drawings:

FIGURE 4 is a circuit diagram of the monitoring arrangement of FIGURE 3;

FIGURES 5a to 5h show electrical waveforms which occur at different points in the circuit of FIGURE 4 during operation;

FIGURE 7 is a circuit diagram of the arrangement shown in FIGURE 6a.

Figure 1:
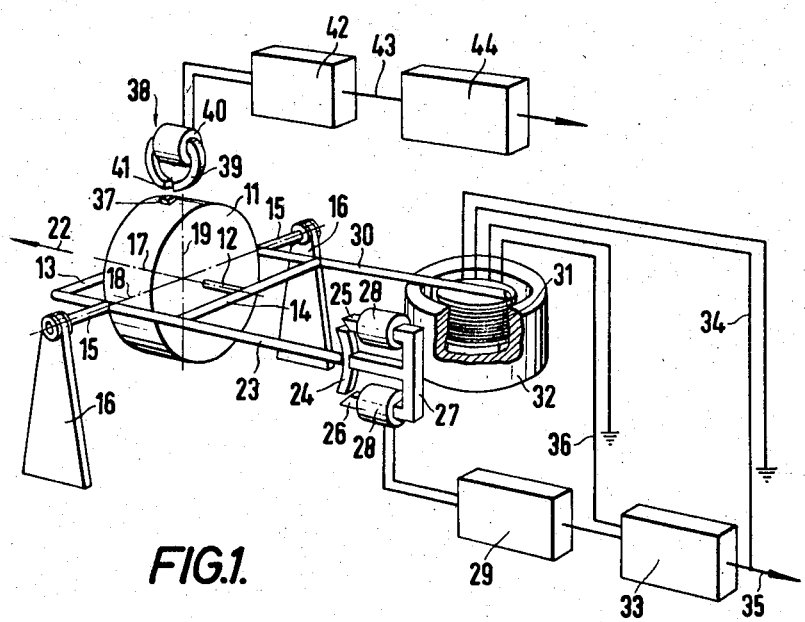
FIGURE 1 is a diagrammatic view of a gyroscope system embodying the invention.

Referring initially to FIGURE 1, a gyroscope rotor 11 is mounted on a spindle 12 which is freely rotatable in bearings carried on cross members 13 and 14 forming part of a gimbal structure carried on a supporting shaft 15 which in turn is rotatable in bearings carried in supports 16, the said supports being a part of the fixed structure of the gyroscope system. The gyroscope rotor 11 is driven by an electric motor (not shown).

Figure 2:
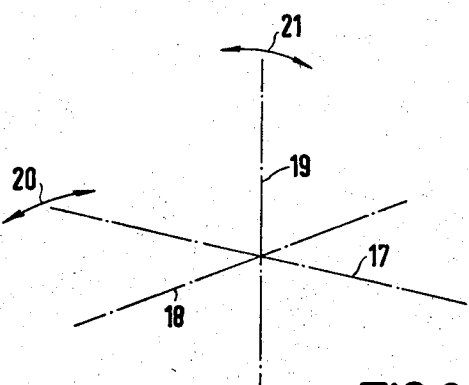
FIGURE 2 is a diagram of the three axes associated with the gyroscope rotor to facilitate explanation.

Referring also to FIGURE 2, a gyroscope rotor 11 rotates with the spindle 12 about an axis 17 and the gimbal structure has one degree of freedom, that is to say, the shaft 15 is rotatable about an axis 18 at right angles to the axis 17. Assuming that the gyroscope rotor 11 is rotating at speed and the gyroscope structure with its supports 16 is turned about a third axis 19, which third axis is mutually at right angles to the axes 17 and 18, the rotation of the structure being in one or other of the directions of the double-headed arrow 20, this rotation will cause the gyroscope rotor 11 to precess, carrying its gimbal with it, that is to say, it will rotate about the axis 18 in one or other of the directions indicated by the double-headed arrow 21. The direction of the precessional rotation will depend upon the direction in which the rotor itself is rotating, and the direction in which the gyroscope structure is rotated about the axis 19 (i.e. the direction along the double-headed arrow 20), while the speed of precessional rotation will depend upon the speed at which the rotor 11 is rotating about its own axis and the rate at which the structure is being deflected from its initial position.

In normal use the gyroscope gimbal is not allowed to rotate freely but is restrained and in that case it develops a torque about the axis 18 which, for a given rotational speed, is directly proportional to the rate at which the structure is being rotated about the axis 19. For example, if the system of FIGURE 1 is mounted in an aircraft which is travelling in the direction of the arrow 22, which is in line with the axis 17, and the aircraft deviates from a straight course, there will be some rotation of the gyroscope structure about the axis 19, whereupon the gyroscope will tend to precess. The gimbal structure of FIGURE 1 includes a rigid arm 23 having at its end a magnetic shoe 24 which, when the system is in its normal undeflected or null position, has its two ends equally spaced from limbs, respectively 25 and 26, of an E-shaped magnetic core structure 27 having coils 28 on the limbs 25 and 26. The coils 28 are supplied with alternating current and if the gyroscope precesses in either direction then the arm 23 tends to rotate about the axis 18 in one direction or the other, so that the shoe 24 will move closer to one of the limbs 25 and 26 and away from the other. This causes a change in the current through the windings 28. The change constitutes a signal and the current through the windings is demodulated in a phase sensitive demodulator 29. A second arm 30 also rigidly connected to the gimbal structure carries a pair of windings 31 supported on a former and these windings are arranged to move into and out of a permanent magnet 32, which is a pot magnet having a central core.

The signal from the phase sensitive demodulator 29 is amplified by an amplifier 33 and fed over a line 34 to one of the windings carried by the arm 30. The output of the amplifier 33 is also fed over a line 35 to other controls or instruments for purposes not directly connected with the invention. One lead of the second winding carried by the arm 30 is fed over a line 36 to a second input of the amplifier 33 and provides a velocity feedback or damping signal when the arm 16 and its winding move, the feedback signal constituting a stabilizing voltage for the servo loop.

In operation, whenever the fixed structure of the gyroscope system is turned about the axis 19, the gyroscope precesses. As soon as the arm 23 begins to move, the change in the signal from the windings 28 is detected by the phase sensitive demodulator 29 and is fed as an output signal to one input of the amplifier 33. The amplifier 33 produces an output over the line 34 which is applied to the first winding carried by the arm 30, and the current through the winding is in such a direction as to set up a magnetic field which reacts with the field of the pot magnet 32 to oppose the precessional movement of the gyroscope. The small movement which does take place, and which provides the control signal, induces a voltage in the second winding carried by the arm 30 which is fed over the line 36, and since the magnitude of this voltage depends on the rate of movement of the winding itself, a velocity voltage is fed to the input of the amplifier 33 and opposes the input voltage from the phase sensitive demodulator 29. It therefore acts as a velocity damping signal. This is the normal operation of the particular gyroscope system described and it is to be understood that the invention is not confined to this particular type of system. Other means such as, for example, hydraulic or pneumatic means, might be used to restrain the gimbal 15, provided that either the output signal giving the angular rate is proportional to the precessing torque when the servo loop is operating correctly, or that further means of monitoring the instrument to provide this signal are included.

In order that the precessional torque for a given deflection of the gyroscope shall remain constant, which is essential if the control system is to function correctly, it is important that the rotor 11 shall be kept running at a uniform predetermined speed. A failure or partial failure of the motor or the power supply to the motor could cause this speed to vary. The speed could also be varied by a fault in the rotor bearings which results in the development of undue frictional resistance. A partial or complete failure in the windings 28, the phase sensitive demodulator 29 and the amplifier 33, or the two windings carried by the arm 30, could allow the rotor 11 in its gimbal to precess by an excessive amount. Any one of these failures or faults is detected by the additional elements which, according to the invention, are added to the system.

Two thin permanent magnets, indicated by reference 37, are arranged side by side at a point on the periphery of the rotor, the north pole of one magnet being adjacent the south pole of the other. These magnets are let into the cylindrical surface of the rotor 11 in the median plane of the rotor, that is to say, the plane in which the gap between the magnets 37 rotates contains the axis 18. Close to the cylindrical surface of the rotor 11 is a magnetic pick-off, generally indicated by reference 38, composed of a core 39 and a winding 40. The core 39 has a very small gap 41 which, when the rotor is in its neutral or null position, is in line with the gap between the magnets 37 as the latter rotate with the rotor. Owing to the arrangement of the magnets 37 there is very little fringe flux and so the magnetic field produced by these magnets 37 falls off in magnitude very rapidly as the distance from the centre line of the ends of the magnet combination is increased. As the rotor rotates the magnets 37 rapidly pass the gap 41 and as the two pairs of magnetic poles successively pass this gap a double impulse is induced in the winding 40, that is to say, there is first an impulse in one direction followed quickly by a second impulse in the reverse direction. The frequency of these double impulses is directly dependent upon the speed of the rotor. If the gyroscope precesses but continues to rotate at its normal speed, the gap between the magnets 37 moves slightly out of alignment with the gap 41 and while the frequency of the impulses will be unaffected (assuming that the rotor continues to rotate at its proper speed) the amplitude of the impulses falls away very rapidly as this misalignment increases.

A detector unit 42 is provided containing circuitry which is responsive both to the frequency and to the amplitude of the impulses fed to it from the winding 40. Accordingly, the detector unit 42 is capable of detecting any change in the speed of the rotor 11 by the change in the frequency of the pairs of impulses and it is also able to detect if the control system allows the gryscope to precess by more than a predetermined amount by the change in the amplitude of the impulses. In this way the detector unit 42 is capable of detecting any one of the numerous failures or faults which were described earlier, and it is so arranged that if it detects any change in the frequency or the amplitude of the impulses which goes outside predetermined limits, it provides a signal over a line 43 which, in the example being described, causes de-energization of a relay 44. It will, of course, be understood that the signal on the line 43 could be used for any one of a variety of purposes but, in the embodiment being described, de-energization of the relay causes an indicating device to be actuated or de-actuated so that either a permanent indication of correct functioning is cancelled or an indication of incorrect functioning is produced.

From the description so far, it will be clear that a very simple means has been provided for indicating whether any one of a large variety of faults or failures has occurred at any point in a complex gyroscope system. Careful consideration will, however, show that another possible fault may arise. In the system so far described it has been assumed that the shaft 15 is freely rotatable in the bearings carried by the supports 16, and the system takes care of faults which would allow excessive precession of the gyroscope, but it does not cover the possibility that, due to unforseen circumstances, a high frictional resistance to rotation develops in the bearings in the supports 16, so that the gyroscope gimbal structure is heavily damped and does not precess to the extent to which it should do in response to rotation of the structure about the axis 19. This is provided for in the further apparatus now to be described.

Figure 3:
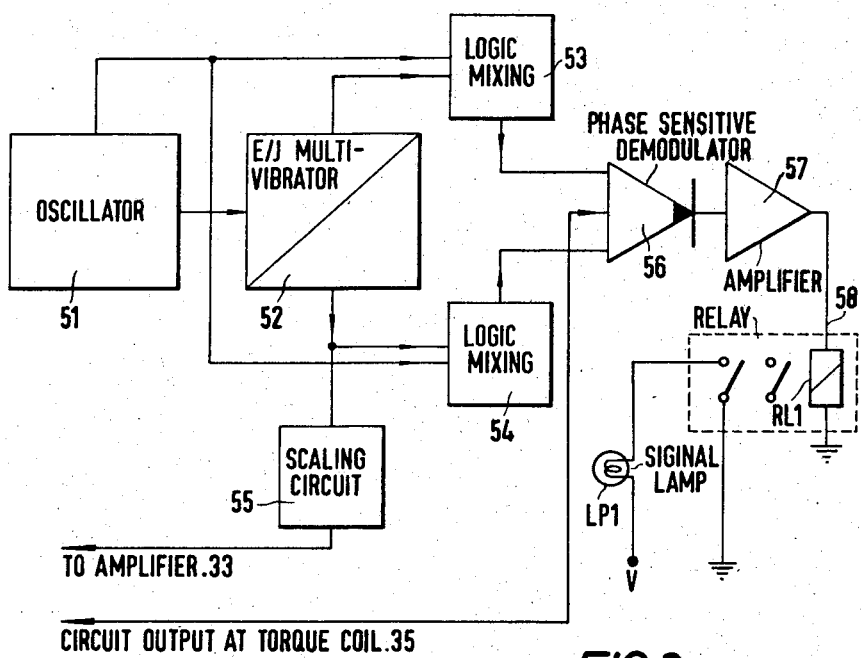
FIGURE 3 is a block schematic representation of an arrangement for monitoring the gimbal movement of the gyroscope system.

FIGURE 3 is a block schematic representation of an arrangement which produces a fault signal in the event that the gimbal bearings between shaft 15 and supports 16 develop a condition which is equivalent to damping of the free movement of the shaft 15 in excess of a predetermined maximum and, of course, the arrangement is sensitive both to excessive friction or to actual jamming of the gimbal structure.

FIGURE 3 shows a square-wave oscillator 51 having one of its outputs fed to the input of a bistable multivibrator 52. The two outputs from the multivibrator 52, which are of opposite phase, are fed as inputs to the logic mixing elements 53 and 54 respectively. The second output of the oscillator 51, which is of opposite phase to the said one output, is fed to the logic mixing elements 53 and 54. The oscillator 51 runs at double the frequency of the multivibrator, and since the two outputs of the multivibrator are of opposite phase at any instant while the inputs from the oscillator 51 are alike, it will be clear that the logic mixing elements 53 and 54 are operating at different levels at any instant. One output of the multivibrator 52 is fed by a scaling circuit 55 as an additional input to the amplifier 33 of FIGURE 1 to provide a disturbance to the gyroscope servo loop.

The outputs from the logic mixing elements 53 and 54 are fed as switching signals to a phase sensitive demodulator 56, together with the output 35 from the amplifier 33 of FIGURE 1. The signal from the phase sensitive demodulator 56 is amplified by an amplifier 57 and fed over a line 58 to the operating winding of a relay RL.1. The relay RL.1, upon being operated, illuminates a signal lamp LP.1. The output of the amplifier 57 is also fed over the line 34 to one of the windings carried by the arm 30 of FIGURE 1.

In operation, the oscillator 51 generates a square waveform which drives the multivibrator 52, the output of which is scaled by the scaling circuit 55, and this is then used to provide a drive waveform for amplifier 33. The oppositely phased output of the oscillator and the outputs of the multivibrator 52 are mixed by the logic mixing elements 53 and 54 to produce demodulator switch waveforms. These waveforms are fed together, with the output of the amplifier 33 (FIGURE 1) to the phase sensitive modulator 56 which provides selective demodulation to ensure that the input differential is balanced out and thus does not produce a high standing direct current at the demoduator output.

The output from the scaling circuit 55 provides an input waveform to the amplifier 33, the output of which is applied to one of the windings on the arm 30 (FIGURE 1) and this waveform is just within the system bandwidth and it tends to move the gimbal assembly due to the output of the amplifier 33 being applied to the said winding on the arm 30. The gimbal system then adjusts itself to offset the influence of this input waveform. Consequently if the gimbal assembly is able to move freely in response to the signal applied to the amplifier 33 the system adjusts itself to this signal by producing a signal from the other winding on the arm 30 which offsets the applied signal. The output at the line 35 is only very small and is equal to the difference between the input signal and the signal from the said other winding. If however, there is excessive damping, i.e., resistance to the free movement of the shaft 15 in the bearings carried by the supports 16, or if the shaft 15 is actually jammed, then the said other winding carried by the arm 30 either produces an unnaturally small signal or no signal at all, and a signal of large amplitude appears at the output line 35. With appropriate phase sensitive rectification an output is obtained, and is used to switch either alarm or changeover circuits via the second contact of relay RL.1.

The waveforms which are generated at various parts of the circuit of FIGURE 3 during the operation thereof are shown in FIGURE 5. Waveforms $a$ and $b$ are the the two waveforms of opposite phase produced by the oscillator 51, the multivibrator 52 being driven by the waveform $a$ and producing waveforms $c$ and $d$ at its two outputs. The logic mixing elements 53 and 54 respectively produce the waveforms $e$ and $f$. The resultant demodulated output waveforms at zero and full output are shown at $g$ and $h$, the signal from the amplifier 33 being the difference between these two signals. Zero output is obtained when the gimbal assembly is working normally and full output is obtained when the gimbal assembly is jammed in its bearings.

FIGURE 4 shows the circuitry for the arrangement of FIGURE 3. The oscillator 51 comprises four transistors, VT1 to VT4, which are arranged to form a free-running multivibrator with cathode follower outputs. One of the outputs is utilized to drive the bistable multivibrator 52 which is constituted by transistors VT5 and VT6, the second output of the oscillator 51 being used also in the mixing circuit. The output of the multivibrator 52 is scaled by the scaling circuit comprising transistors VT7 and VT8 to provide a waveform for feeding into the amplifier 33.

In normal operation, the signals provided by the said other winding carried on the arm 30 are applied in opposition to the input from the scaling circuit to the amplifier 33 so that the amplifier 33 provides an output corresponding to the difference between the two opposed inputs. Under conditions of excessive damping or actual jamming of the gimbal bearings, however, the said other winding carried by the arm 30 produces either a seriously reduced output or no output at all, and a waveform of high amplitude appears at the output of the amplifier 33. This output is demodulated by the phase sensitive demodulators comprised of transistors VT7 and VT8 and is then filtered and applied to the amplifier composed of transistors VT9 and VT10 connected as a long-tailed pair. The output of the amplifier constituted by transistors VT9 and VT10 under conditions of heavy damping or jamming, switches off a further amplifier constituted by transistor VT11. The consequent fall in the collector potential of transistor VT11 turns on a biased transistor VT13 which, in turn, causes a further transistor VT12 to be bottomed, and the collector current of VT12, passing through the winding of relay RL.1, causes the relay to operate and to switch on the lamp LP.1 and carry out any other desired function with its second pair of contacts.

Figure 6A:
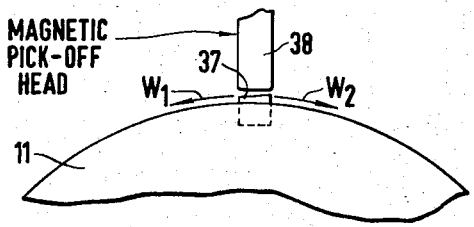
FIGURE 6a is a diagrammatic representation of an arrangement for monitoring the rotation of a gyroscope rotor.
Figure 6B:
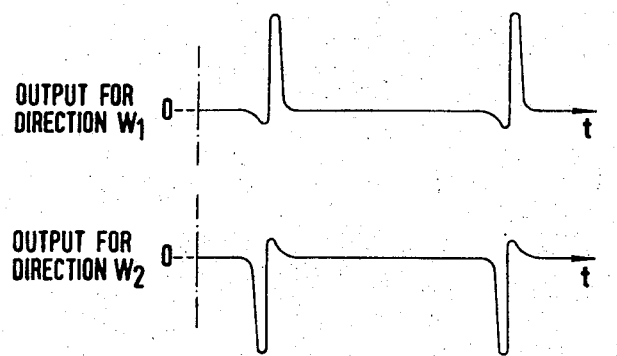
FIGURE 6b shows the output waveforms obtainable from the arrangement of FIGURE 6a for different directions of rotation.

FIGURE 6a shows the means for monitoring the direction of rotation of the gyroscope rotor 11. Two thin permanent magnets, indicated by reference 37, are arranged side by side, the north pole of one magnet being adjacent the south pole of the other. These magnets are let into the curved surface of the rotor 11 in the median plane of the rotor, that is to say, the plane in which the gap between the magnets 37 rotates includes the axis 18 (FIGURES 1 and 2). Close to the curved surface of rotor 11 is a magnetic pick-off, generally indicated by reference 38, composed of a core and a winding (not shown). The outer surfaces of the magnets 37 are cut away at an oblique angle so that the co-operating surfaces of the magnets 37 and the pick-off 38 are at an angle to each other. When the rotor is running and the apparatus is in its normal, unprecessed state, the gap between the magnets 37 is in line with the gap in the magnetic pickoff and each time the magnet assembly 37 passes the pick-off head 38 induces a double pulse in the pick-off, as described earlier. This pulse is amplified and its negative half, which is sufficiently large, is used to clamp a capacitor which normally charges through a resistance towards the HT line. With the rotor 11 rotating in a direction $W_1$, as indicated in FIGURE 6a, output pulses are developed, as indicated in FIGURE 6b, having a small negative peak and a high positive peak due to the fact that the distance separating one edge of the magnet 37 from the pick-off head is greater than that separating the other edge of the magnet. If, however, the direction of rotation of the rotor is reversed, that is to say, if the rotor rotates in the direction of the arrow $W_2$, a double impulse is again produced but in this case the negative portion is of high amplitude and the positive portion is of low amplitude. The output double impulses are produced at regular intervals to clamp the capacitor so that the resulting waveform on the capacitor is a saw-tooth, the amplitude of which is a function of rotor speed and HT voltage. If the output pulses are as shown in the top part of FIGURE 6b for the direction $W_1$, then the negative parts of the double impulse are of small amplitude and the saw-tooth amplitude of the capacitor voltage reaches a level such that an amplifier (not shown) having its input connected thereto is biased into conduction and this switches on a bistable multivibrator which de-energizes output relays (not shown), which cause the direction of rotation to be reversed. The bistable multivibrator is manually reset by means of a switch or button.

Referring to FIGURE 7, there is shown the circuitry used to carry out the functions just described in conjunction with the magnet and pick-off system shown in FIGURE 6a.

The output of the pick-off 38 is amplified by transistor VT14 and if the output is of sufficient amplitude it overrides the bias on a transistor VT15 to operate a clamp stage transistor VT16 which discharges a capacitor C12.

When unclamped, the capacitor C12 is charged through a resistor R43. If the potential across the capacitor C12 exceeds that on the junction of two resistors R46 and R47 by more than the $V_{be}$ required to turn on a transistor VT17, then transistor VT17 conducts and resets a bistable multivibrator composed of transistors VT18 and VT19, which was set with the left-hand transistor VT18 not conducting. When VT18 is switched to conduction the voltage drop at its collector causes transistors VT20, VT21, VT22 and VT23 to be cut off and allows the relay RL.2 to release, and the release of RL.2 causes the direction of rotation of rotor 11 to be reversed.

In describing the circuitry of FIGURES 4 and 7 only the particular functions of the various elements of the circuitry were explained and no reference was made to details which it is considered will be understood by those skilled in the art without further explanation.

We claim:

1. A gyroscope system which comprises: a rate gyro; a closed loop control arrangement operable to oppose motion of the gyro gimbal under precession torque which may be developed in the gyro rotor; magnet means carried by the gyro rotor; pick-off means which co-operates with the magnet means so as to develop output signals the frequency and amplitude of which are indicative of the speed of rotation and precessional movement, respectively, of the gyro rotor; and monitoring means operable to monitor output signals developed by the pick-off means so as to provide a continuous indication as to whether the rotational speed and precessional movements of the gyro rotor are within predetermined limits.

2. A system according to claim 1 in which the magnet means comprises two magnetic elements which extend, side by side, in the direction of rotor rotation and have the poles of one element adjacent the opposed poles of the other element so as to produce a resultant magnetic field whose strength decreases rapidly with distance from the element both in the direction of rotor rotation and in the direction of precessional movement of the gyro rotor.

3. A system according to claim 2 in which the magnet elements carried by the rotor and a surface of the pick-off means are inclined relatively to one another so that, when the magnet elements are passing the pick-off means, the said surface and the magnetic elements define a flux gap which tapers in the direction of rotor rotation so that when the rotor rotates a positive going or a negative going impulse is developed in the pick-off means.

4. A gyroscope system comprising
   a rate gyro,
   a closed loop control arrangement operable to oppose motion of the gyro gimbal under precession torque which may be developed in the gyro rotor, said control arrangement including pick-off means for detecting precession movement of the gyro rotor, and a torque means for opposing precessional movement detected by said pick-off means,
   test means for energizing said torque means to induce cyclic precessional movement to said rotor,
   and logic means connected to both said test means and said pick-off means to produce a fault signal when the amplitude of cyclic precessional movement detected by said pick-off means is a predetermined amount less than that which should be induced by said test means.

5. A gyroscope system comprising
   a rate gyro,
   a closed loop control arrangement operable to oppose motion of the gyro gimbal under precession torque which may be developed in the gyro rotor, said control arrangement including pick-off means for detecting precessional movement of the gyro rotor, and torque means for opposing precessional movement detected by said pick-off means,
   said control arrangement including means for monitoring gimbal damping.

6. A system as claimed in claim 1 comprising means to monitor the speed of said gyroscope rotor and the amount of its deflection from a neutral position.

7. A system as claimed in claim 6 in which the said means are electrical in nature.

8. A gyroscope system including a rate gyroscope comprising electrical means associated with the gyroscope rotor to monitor the rotation thereof, means responsive to any departure from predetermined operational conditions to provide a signal signifying a fault, said means responsive to said departure comprising means for producing a fault signal in the event that the gimbal structure of the gyroscope system is subjected to damping conditions which produce a resistance to movement in excess of a predetermined maximum, a servo loop control system for monitoring the gimbal structure, input means capable of applying an electrical input signal tending to move said gimbal structure, means in said servo loop control system to produce an electrical signal to counter said input signal during correct operation of the gyroscope system, and means to produce an output fault signal if the counter signal from the servo loop control system is below a predetermined level with respect to said input signal because the movement of said gimbal structure is subjected to excessive damping.

9. A gyroscope system including a rate gyroscope comprising electrical means associated with the gyroscope rotor to monitor the rotation thereof, and means responsive to any departure from predetermined operational conditions to provide a signal signifying a fault, said means to monitor the rotation of the gyroscope rotor comprising means for determining the direction of rotation of said gyroscope rotor.

10. A system as claimed in claim 9 in which the means to determine the direction of rotation comprises magnetic elements fitted into the cylindrical surface of said gyroscope rotor so as to rotate therewith, and a stationary pick-off co-operating with said magnetic elements to produce pulse signals.

11. A system as claimed in claim 10 in which the said magnetic elements comprise two permanent magnets arranged side by side, the north pole of one magnet being adjacent the south pole of the other, the co-operating portions of said magnets and the pick-off being set at an angle to one another so that pulse signals of opposite sense are induced in the pick-off, the order in which the signals occur signifying the direction of rotation.

12. A system as claimed in claim 11 comprising means to reverse the direction of rotation of said gyroscope rotor if this is incorrect.

13. A gyroscope system including a rate gyroscope comprising electrical means associated with the gyroscope rotor to monitor the rotation thereof, means responsive to any departure from predetermined operational conditions to provide a signal signifying a fault, and means to monitor the speed of said gyroscope rotor and the amount of its deflection from a neutral position, said means to indicate a failure comprising a detector responsive to a signal from said monitoring means which corresponds in frequency with the rate of rotation and in amplitude with the proximity of the gyroscope to the null position.

14. A system as claimed in claim 13 comprising a pair of magnets let into the surface of said gyroscope rotor in the median plane thereof, and a magnetic pick-off which is in line with the gap between said magnets when said rotor is in its neutral position whereby the amplitude of the signals induced in the pick-off decreases very rapidly as the rotor moves from its neutral position, whereby the frequency of the induced signals is equal to the rate of rotation and the amplitude of the induced signals depends upon the position of said rotor with respect to its neutral position.

15. A gyroscope system including a rate gyroscope comprising means for producing a fault signal in the event that the gimbal structure of the gyroscope system is subjected to damping conditions which produce a resistance to movement in excess of a predetermined maximum, means to monitor the speed of rotation of said gyroscope rotor and the amount of its deflection from a neutral position, servo loop control system for monitoring the gimbal structure, input means capable of applying an electrical input signal tending to move said gimbal structure, means in said servo loop control system to produce an electrical signal to counter said input signal during correct operation of the gyroscope system, and means to produce an output fault signal if the counter signal from the servo loop control system is below a predetermined level with respect to said input signal because the movement of the gimbal structure is subjected to excessive damping.

16. A gyroscope system including a rate gyroscope comprising means for producing a fault signal in the event that the gimbal structure of the gyroscope system is subjected to damping conditions which produce a resistance to movement in excess of a predetermined maximum, means to monitor the speed of rotation of said gyroscope rotor and the amount of its deflection from a neutral position, and means to monitor the speed of said gyroscope rotor, said means including a detector responsive to a signal from the monitoring means which corresponds in frequency with the rate of rotation and an amplitude with the proximity of the gyroscope to the null position.

17. A system as claimed in claim 16 comprising a pair of magnets let into the surface of said gyroscope rotor in the median plane thereof, and a magnetic pick-off which is in line with the gap between the magnets when the rotor is in its neutral position, whereby the amplitude of the signals induced in the pick-off decrease very rapidly as the rotor moves from its neutral position, so that the frequency of the induced signals is equal to the rate of rotation and the amplitude of the induced signals depends upon the position of the rotor with respect to its null position.

18. A gyroscope system including a rate gyroscope comprising a servo loop control system for monitoring the gimbal structure of the gyroscope, input means capable of applying an electrical input signal tending to move said gimbal structure, means in said servo loop control system to produce an electrical signal to counter said input signal during correct operation of the gyroscope system, means to produce an output fault signal if the counter signal from the servo loop control system is below a predetermined level with respect to said input signal because the movement of said gimbal structure is subjected to excessive damping, a pair of magnets let into the surface of said gyroscope rotor in the median plane thereof, and a magnetic pick-off placed in line with the gap between said magnets when said gyroscope rotor is in its null position, whereby the amplitude of the signals induced in said pick-off decrease very rapidly as the rotor moves from its neutral position, so that the frequency of the induced signals is equal to the rate of rotation and the amplitude of the induced signals depends upon the position of the rotor with respect to its null postiion.

19. A system as claimed in claim 18 in which the co-operating portions of said magnets and pick-off are set at an angle to one another, whereby each pulse signal consists of a pair of pulses of opposite sense, the order in which the pulses occur signifying the direction of rotation.

20. A system as claimed in claim 19 comprising means to reverse the direction of the gyroscope if this is incorrect.

References Cited

UNITED STATES PATENTS

| | | | |
|---|---|---|---|
| 2,753,718 | 7/1956 | Howe | 74—5.6 |
| 2,864,255 | 12/1958 | Stern et al. | 74—5.4 |
| 3,077,760 | 2/1963 | Packard | 74—5.4 X |
| 3,186,211 | 6/1965 | Reed et al. | 73—1 |
| 3,218,872 | 11/1965 | Swainson | 74—5.6 |
| 3,277,725 | 10/1966 | Kingsborough et al. | 74—5 X |

FRED C. MATTERN, Jr, *Primary Examiner.*

J. PUFFER, C. J. HUSAR, *Assistant Examiners.*